US011713187B2

(12) United States Patent
Rodgers (10) Patent No.: US 11,713,187 B2
(45) Date of Patent: *Aug. 1, 2023

(54) ARTICLES OF COMPOSITE CONSTRUCTION AND METHODS OF MANUFACTURE THEREOF

(71) Applicant: OMNI TANKER TECHNOLOGY PTY LTD (ACN 135 294 772), Sydney (AU)

(72) Inventor: William Rodgers, Randwick (AU)

(73) Assignee: OMNI TANKER TECHNOLOGY PTY LTD (ACN 135 294 772), Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/343,568

(22) Filed: Jun. 9, 2021

(65) Prior Publication Data

US 2021/0300675 A1    Sep. 30, 2021

Related U.S. Application Data

(60) Continuation of application No. 15/357,737, filed on Nov. 21, 2016, now Pat. No. 11,059,665, which is a
(Continued)

(30) Foreign Application Priority Data

Feb. 17, 2006 (AU) .................................. 2006900786

(51) Int. Cl.
*B29C 41/20* (2006.01)
*B65D 90/02* (2019.01)
(Continued)

(52) U.S. Cl.
CPC ............ *B65D 90/022* (2013.01); *B29C 33/62* (2013.01); *B29C 39/08* (2013.01); *B29C 39/10* (2013.01);
(Continued)

(58) Field of Classification Search
CPC ...... B29C 70/323; B29C 70/326; B29C 41/20
See application file for complete search history.

(56) References Cited

U.S. PATENT DOCUMENTS 2,859,151 A    11/1958 Usab et al.
3,158,383 A    11/1964 Anderson et al.
(Continued)

FOREIGN PATENT DOCUMENTS

JP    56-133124 A    10/1981
JP    62-282929      12/1987
(Continued)

OTHER PUBLICATIONS

Derwent Abstract Accession No. 87-080441/12, Class P73, DD212003 A (Schlegbl H) Aug. 1, 1984 and Google Patent translation.
(Continued)

*Primary Examiner* — Matthew J Daniels
(74) *Attorney, Agent, or Firm* — Greenblum & Bernstein, P.L.C.

(57) ABSTRACT

An article manufactured in a mould and which comprises a structural composite of plastics layers, the article having a wall defining an internal space for holding contents therein; wherein, the wall is formed from at least two layers of plastics materials; wherein a first of said layers comprises a thermoplastics material and at least a second layer comprises a thermosetting resin and a fibrous layer.

8 Claims, 10 Drawing Sheets

Related U.S. Application Data division of application No. 13/763,076, filed on Feb. 8, 2013, now abandoned, which is a continuation of application No. 12/279,755, filed as application No. PCT/AU2007/000165 on Feb. 17, 2007, now abandoned.

(51) Int. Cl.

| | | |
|---|---|---|
| *B32B 27/12* | (2006.01) | |
| *B32B 1/02* | (2006.01) | |
| *B29C 70/32* | (2006.01) | |
| *B60P 3/22* | (2006.01) | |
| *B32B 27/30* | (2006.01) | |
| *B32B 27/38* | (2006.01) | |
| *B32B 27/32* | (2006.01) | |
| *B32B 27/40* | (2006.01) | |
| *B62D 29/04* | (2006.01) | |
| *B32B 7/04* | (2019.01) | |
| *B32B 27/36* | (2006.01) | |
| *B32B 27/00* | (2006.01) | |
| *B29C 39/08* | (2006.01) | |
| *B29C 33/62* | (2006.01) | |
| *B29C 39/10* | (2006.01) | |
| *B29C 39/12* | (2006.01) | |
| *B29C 39/36* | (2006.01) | |
| *B60K 15/03* | (2006.01) | |
| *B64C 3/34* | (2006.01) | |
| *B65D 88/12* | (2006.01) | |
| *B29L 31/30* | (2006.01) | |
| *B29L 31/00* | (2006.01) | |
| *B29C 45/14* | (2006.01) | |

(52) U.S. Cl.
CPC ............ *B29C 39/123* (2013.01); *B29C 39/36* (2013.01); *B29C 41/20* (2013.01); *B29C 70/323* (2013.01); *B32B 1/02* (2013.01); *B32B 7/04* (2013.01); *B32B 27/00* (2013.01); *B32B 27/12* (2013.01); *B32B 27/302* (2013.01); *B32B 27/304* (2013.01); *B32B 27/306* (2013.01); *B32B 27/308* (2013.01); *B32B 27/32* (2013.01); *B32B 27/36* (2013.01); *B32B 27/38* (2013.01); *B32B 27/40* (2013.01); *B60K 15/03* (2013.01); *B60P 3/2205* (2013.01); *B62D 29/043* (2013.01); *B62D 29/046* (2013.01); *B64C 3/34* (2013.01); *B65D 88/12* (2013.01); *B29C 2045/14319* (2013.01); *B29L 2031/3085* (2013.01); *B29L 2031/7126* (2013.01); *B29L 2031/7172* (2013.01); *B32B 2260/021* (2013.01); *B32B 2260/046* (2013.01); *B32B 2262/101* (2013.01); *B32B 2262/106* (2013.01); *B32B 2439/40* (2013.01); *B32B 2605/00* (2013.01); *B32B 2605/18* (2013.01); *B60K 2015/03032* (2013.01); *B60K 2015/03046* (2013.01); *B65D 88/128* (2013.01); *Y02T 50/40* (2013.01); *Y10T 428/1362* (2015.01); *Y10T 428/249921* (2015.04); *Y10T 428/3154* (2015.04); *Y10T 428/31511* (2015.04); *Y10T 428/31544* (2015.04); *Y10T 428/31587* (2015.04); *Y10T 428/31797* (2015.04); *Y10T 442/387* (2015.04); *Y10T 442/3854* (2015.04); *Y10T 442/3878* (2015.04); *Y10T 442/3886* (2015.04); *Y10T 442/59* (2015.04)

(56) References Cited

U.S. PATENT DOCUMENTS

| | | | |
|---|---|---|---|
| 3,687,087 | A | 8/1972 | Yurcoski et al. |
| 3,712,250 | A | 1/1973 | Geyer et al. |
| 3,783,060 | A | 1/1974 | Goldsworthy et al. |
| 3,788,916 | A | 1/1974 | Gadelius |
| 3,900,355 | A | 8/1975 | Goto |
| 3,981,955 | A * | 9/1976 | Otani .................. B29C 70/326 264/DIG. 53 |
| 4,038,001 | A | 7/1977 | Stinnes |
| 4,053,126 | A * | 10/1977 | Duret .................... B29C 41/46 244/119 |
| 4,186,235 | A * | 1/1980 | Bramwell ............... B32B 27/10 442/361 |
| 4,257,527 | A | 3/1981 | Snyder |
| 4,283,066 | A | 8/1981 | Brown et al. |
| 4,292,898 | A | 10/1981 | Gordon et al. |
| 4,363,687 | A | 12/1982 | Anderson |
| 4,729,570 | A | 8/1988 | Welch, Jr. |
| 4,927,699 | A | 5/1990 | Melcher |
| 6,030,557 | A | 2/2000 | Payne |
| 11,059,665 | B2 | 7/2021 | Rodgers |
| 2004/0241415 | A1 | 12/2004 | Wadahara |
| 2006/0110599 | A1 | 5/2006 | Honma et al. |
| 2006/0234028 | A1 | 10/2006 | Pardo |

FOREIGN PATENT DOCUMENTS

| | | |
|---|---|---|
| JP | 05301221 A | 11/1993 |
| JP | 10128896 | 5/1998 |
| JP | 2006/044262 A | 2/2006 |
| WO | 2004/062893 A1 | 7/2004 |

OTHER PUBLICATIONS

Derwent Abstract No. 76-432A/43, Class A35 (A92), DL 130217 A (Reinhard K G), Mar. 15, 1978 and Google translate translation.
Official Communication issued in European Patent Office (EPO) Patent Application No. 07 701 496.7, dated Feb. 17, 2016.
JP2006044262 Machine Translation, Toray Industries, 19 pages. (Year: 2006).

\* cited by examiner

The iso-tensoid shape is generated by the incremental plotting of X and Y.

ARTICLES OF COMPOSITE CONSTRUCTION AND METHODS OF MANUFACTURE THEREOF

CROSS-REFERENCE TO RELATED APPLICATIONS

This application is a continuation of U.S. patent application Ser. No. 15/357,737, filed Nov. 21, 2016, which is a division of U.S. patent application Ser. No. 13/763,076, filed Feb. 8, 2013, abandoned, which is a continuation of U.S. patent application Ser. No. 12/279,755, filed Jun. 17, 2009, abandoned, which is a National Phase of International Application No. PCT/AU2007/000165, filed Feb. 17, 2007. The entire disclosure of each of the above-identified applications, including the specification, drawings, and claims, is incorporated herein by reference in its entirety. This application claims priority to Australian Application No. 2006900786, filed Feb. 17, 2006.

BACKGROUND

The present invention relates to manufacture of articles from composite plastics materials and particularly to storage vessels of composite construction. More particularly, the invention relates to a method of manufacture of storage vessels in particular though not exclusively, for liquid storage and transport and which are manufactured from a layered plastics composite. The invention further relates to a method of joining plastics materials to form a composite structure for use in the manufacture of articles including storage vessels. The invention further relates to applications of vessels of composite construction to tanks for transport of fluids and fuel tanks including but not limited to aircraft tanks.

PRIOR ART

Large storage vessels are widely used for transporting products such as liquids and in the case of road transportation, various designs of tank have been produced to suit rigid chassis vehicles which are self powered and semi trailers which are pulled by a prime mover or tractor unit.

Known designs of storage vessels for transport vehicles typically comprise a single tank mounted on a chassis of a vehicle or trailer. Most tanks are formed with an integral longitudinal sub-chassis by which the tank is secured to the chassis of the vehicle or trailer. This is intended to allow considerable flexing of the chassis, especially along its length, to accommodate variations in ground level. When a tank is secured to a rigid vehicle chassis, the usual approach is to secure it using nuts and bolts connecting the chassis and the tank sub-chassis at several positions along its length. A thin layer of rubber or felt may be positioned between respective chassis members to prevent rubbing due to metal to metal contact.

As a consequence of the presence of the securely mounted tank, the assembly is considerably stiffer than the chassis itself. Most known metal tanks are sub-divided into a series of separate compartments each with their own inlet and outlet, particularly when used for transporting petroleum products. This also enables different liquids to be carried. In the case of fuels or lubricants, different grades of fuels or lubricants can be carried in the one vehicle in different compartments.

These multi-compartment tanks are known to have suffered from cracking of one or more of the internal dividing walls and even the outer walls of the tank shell. This can result in contamination of the contents of one compartment with those of another and/or leakage of the contents. This needs to be avoided so tanks have to be checked regularly to ensure integrity of each compartment and the general integrity of each tank.

The cracking is believed to arise because of the repeated stressing of the tank due to the motion of the vehicle in use. Since the vehicle chassis or trailer chassis is less rigid than the tank any forces which cause twisting of the chassis will be transferred into the tank. However, the metallic tanks are sometimes not able to resist these repeated twisting forces leading to cracking of the internal dividing walls and/or the external shell.

One attempt to try and solve this problem in the case of a rigid vehicle tank has been to mount the sub-chassis of the tank rigidly to the chassis of the vehicle at the rear of the chassis and to mount the other end of the tank chassis to the front of the vehicle. Flexing of a vehicle chassis or trailer can be in excess of 150 mm over the length of a typical chassis. Allowing for such a range of movement is an important consideration in tank design.

One of the known tanker arrangements provides a road or rail tanker comprising a wheeled chassis and a plurality of tanks disposed in series one behind the other. The plurality of tanks are individually mounted on a chassis each using a plurality of flexible mounts. A flexible mounting can be readily constructed to allow such amounts of movement while providing adequate support for the tank. The individual tanks are spaced apart in the longitudinal direction by an amount necessary to accommodate the permissible range of movement of each tank as the chassis twists and bends.

It is preferred to provide at least 4 mountings for each tank. The number could be increased to carry heavier weights or individual mountings could be made stronger. Tanks that are at present made of steel to better withstand the imposition of bending and twisting forces can now be made of light alloys, such as aluminium. The reduction in weight enables the tanks to be larger, thereby permitting increased quantities of liquid to be carried without increasing the overall vehicle/trailer gross weight. This has economic benefits for operators and allows more pay load.

Storage tank technology is continually evolving and this had lead to a variety of design changes to the basic heavy duty metal skin storage tanks. Heavy duty transport tanks have traditionally been constructed from metals such as steel or aluminium. Some tanks have been adapted with insulating liners such as that disclosed in U.S. Pat. No. 3,687,087 which discloses a resilient insulating structure on the interior surface of a railway freight car body. The resilient insulating structure comprises a layer of polyurethane foam material having its outer surface secured to the inner surface of the metallic car body and an elastomeric inner liner secured to the inner surface of the polyurethane foam material. The polyurethane foam material forms an intermediate cushioning layer for the elastomeric inner liner and is of a thickness at least around 1 inch and may be as great as around 8 inches. The elastomeric inner liner is less than around ½ inch thickness and has a stiffness less than the stiffness of the foam material. Some of the energy created by forces exerted by the lading against the resilient insulating structure is dissipated by the deformation of the insulating structure with the remainder of the energy being transmitted to the railway car body through the insulating structure. Upon unusually high local stresses being exerted, such as from a tool or a workman within a car, the intermediate foam layer may be deformed permanently while the elastomeric inner liner in contact with the lading remains undamaged.

The traditional known road tankers typically have a cylindrical tank resiliently supported on a bed frame of rectangular configuration and disposed above the main frame of the truck with the tank being disposed partially within the horizontal plane of the bed frame and having the bed frame resiliently supported on the main frame of the truck. A pair of saddle-shaped plates conforming to the outside of the cylindrical tank are secured thereto, one close to each end of the tank, and a pair of upper tank hold down brackets are secured to each saddle plate and in turn are resiliently bolted to corresponding lower tank hold down brackets which are rigidly secured to the bed frame. The brackets secured to the bed frame are in turn bolted to corresponding brackets on the main truck frame.

An example of this construction is disclosed in U.S. Pat. No. 4,283,066. There have been some attempts to manufacture tanks from materials alternative to metals such as more lightweight materials. One example of that is disclosed in U.S. Pat. No. 4,292,898 which discloses a filament wound composite railroad car including an elongated, load bearing body having walls formed of a specified fiber reinforced plastic resin composite of glass reinforcing filaments and a structural organopolymeric resin having particular characteristics.

Another attempt to provide a lightweight trailer tank is disclosed in U.S. Pat. No. 4,729,570 which discloses a chassisless fiberglass tank trailer including a tank shell formed of a fiberglass reinforced isotholic resin, with fiberglass filaments bias-wound at an angle of approximately 45 degrees. The tank shell has a forward head and a rear head for forming a fluid carrying container. A forward cradle is attached to the tank shell with mounting portions used for mounting a fifth wheel member, and a rear cradle is attached to the tank shell and having mounting portions used for mounting a rear wheel carriage. A plurality of circumferential reinforcing ribs are located between earl of the mounting portions and at other desired locations longitudinally on the tank shell. The ribs are also molded in with fiberglass reinforced resin. Each rib has an enlarged upper portion for providing rollover protection. Prior to applying the fiberglass resin to the cradles and ribs, circumferential bands are positioned thereon for providing additional strength. Openings in the trailer include overflow protection. Baffles may be provided for preventing undesired fluid movement in the trailer.

The prior art is replete with various vehicles such as rail cars and road vehicles which accommodate storage tanks usually made of metals and which either sit on a vehicle chassis or have sufficient structural strength to allow self support but mounted on wheels. Railroad tank cars have been made wherein a tank is cradled near its ends in cradle structures mounted on the trucks, as shown in Geyer, et al. U.S. Pat. No. 3,712,250. Tanks have also been made of fiber glass reinforced plastics, as shown in Anderson, et al. U.S. Pat. No. 3,158,383, and such tanks have been mounted on metallic, load-bearing railroad car under frames of the sort shown in the aforesaid U.S. Pat. No. 3,712,250. Railroad cars of the prior art have included heavy supporting structures and/or heavy structural elements that have required a substantial portion of the gross weight of a loaded car to be the weight of the car itself. These heavy structural elements have generally included longitudinal metallic structural elements to transmit and withstand the substantial longitudinal forces exerted on the car during service. Because the gross weight of a railroad car is limited by regulations, any reduction in the weight of the car itself while maintaining structural integrity is desirable because it permits a larger payload and hence more economical operation.

Although there has been some known use of non metallic materials in tank construction such as in portable concrete mixing drums, to the best of the applicant's knowledge the prior art does not teach road, rail or air tankers which have a storage tank manufactured from plastics such as thermoplastics or thermoset resins. The Applicant is not aware of any tanks whose wall is manufactured from layered plastics and which can resist applied loads to an integrity standard usually met by use of metals.

Since plastics are lightweight that is a desirable material to contemplate but the vast difference in properties between steel and plastics particularly in relation to in use load response and the difficulties in manufacture of plastics products is a challenge which must first be overcome whilst recognizing that there were numerous structural and manufacturing difficulties to be overcome in making a transition from steel to plastics not the least of which is the production of a tank which could withstand the high static and dynamic loadings to which such tanks subject to in normal operation. Also, in the case of fluids carriage and storage such as petroleum products the internal skin of the tank must be chemically inert and non reactive. Thus, the previously unmet challenge to produce an alternative to the known steel storage and transport tanks would require in combination a plastics tank which is chemically inert and non reactive, has high durability and capacity to withstand internal load from contents and externally applied loads. Another technical problem is use of plastics is to achieve satisfactory bonding of layers in the case of a laminated structure. Some plastics do not naturally bond.

Thermoplastics are a known class of materials, solid at ambient temperature, which soften and melt at high temperatures to be suitable for moulding articles which recover their original properties at ambient temperatures. Thermoset resins are known liquids which when mixed with the appropriate curative or catalyst gel and harden after an appropriate time. They are used to build laminated structures reinforced with fibres.

Thermoplastics have better chemical resistance than the thermosets, so that a dual construction with both these materials combines their chemical resistance and structural capability. These two material types are not compatible in a laminated construction. In particular the thermosets will not bond to the thermoplastics. It is a part of known art to form thermoplastic sheets with woven cloth pressed into one of the surfaces while the plastic is still soft so that the fibres are partly embedded. Thermoset resin and fibres are then laminated onto these cloth fibres which then form a mechanical coupling between the two non bondable materials. The weaknesses of these procedures are that it is difficult to form a strong embedment and the cloth is prone to pull out of the thermoplastic in service. The sheet material is flat and can only be formed into containers by the process of fabrication by cutting and welding.

Invention

The present invention provides an alternative to the known art of storage tank constructions and particularly mobile storage vessels of composite construction. More particularly, the invention provides a method of manufacture of storage vessels in particular though not exclusively, for liquid storage and transport and which are manufactured from a layered plastics composite. The invention further relates to applications of vessels of composite construction to tanks for road and rail transport of fluids and fuel tanks including but not limited to aircraft tanks and aircraft wing tanks.

It is one object of the present invention to provide a lightweight mobile storage tank for road, rail and air applications and which is manufactured from a matrix of dual thermoplastic and thermoset resins.

It is another object of the invention to provide a method of coupling two dissimilar plastic materials which do not naturally form a bond, by allowing one of the materials to flow partially through a fibrous layer and then to wet the remaining fibres with the second material. The materials are preferably mechanically coupled together by the fibres which traverse the interface between the two materials. In is another object of invention to manufacture articles from such joined materials.

The invention further provides a structural matrix for construction of such articles as storage tanks and includes a first thermoplastic material which is liquid and flowable at a temperature above its melting point, a fibrous layer and a second layer of a thermosetting resin which is applied to the fibrous layer after cooling of said thermoplastic layer.

Thermoplastics have excellent chemical resistance to a wide range of pH, oxidative and solvent conditions and large elongation without damage. The thermosetting resins, when reinforced by structural fibres have high strength and stiffness. Both have low density, so the combination is best suited to the situations benefiting from light weight structures in aggressive chemical environments.

The present invention is particularly advantageous used in and with vehicles and containers for the transport of hazardous materials and in the construction of fuel and cargo tanks for the transport vehicles. Specific applications of the matrix method of the present invention include:

1 Fuel tanks for marine, road, rail, air and space vehicles and craft.
2 Cargo tanks for the carriage of hazardous chemicals, fuels, milk and beverages (wine beer and fruit juices) by the various transportation modes.
3 Cargo tanks for all these applications where the tanks are mounted on wheeled systems.
4 Cargo tanks which are mounted in standardised ISO intermodal container frames In its broadest form the present invention comprises:
a mobile storage tank manufactured from a mould, the tank comprising a wall defining an internal space for holding tank contents; wherein, the wall is formed from at least two layers of plastics material and a reinforcing layer engaging each said layers, a first of said layers being a thermoplastics material and a second layer comprising a resin, wherein the reinforcing layer is interposed between said layers to form a plastics composite.

According to a method aspect the present invention comprises:

A method of manufacture of a composite for use in the construction of a hollow vessel, the method comprising the steps of:
b) placing at least one layer of fibrous material in apposition to an opposing surface of the mould;
b) taking a first layer of a thermoplastics material
c) heating the thermoplastics layer sufficient to morph from a solid to a flowable state;
d) allowing the first layer to flow at least part way through the thickness of the at least one fibrous layer;
e) allowing the first layer to cool so that at least some fibres of the at least one fibrous layer are embedded in the first layer;
f) applying a thermosetting resin to fibres of the fibrous layer not embedded in the first layer to form a second layer such that the first layer is bonded with the second layer.

According to one embodiment of the method aspect the method comprises the further step of applying at least one additional fibrous layer and thermosetting resin to the second layer.

According to a preferred embodiment, the fibrous layer is initially formed into a predetermined required shape following which the thermoplastic layer is melted around the fibrous layer causing it to flow part way through the thickness of the fibrous layer. The composite thus fax is allowed to cool and return to its ambient temperature properties. A thermosetting resin is then applied to those fibres which were not incorporated into the thermoplastic. Further layers of fibres and thermosetting resin may be applied depending upon the structural characteristics of the required article or structure to be manufactured from the composite matrix.

According to one embodiment, the tank is mounted on a vehicle. According to another embodiment the tank is mounted in an aeroplane wing.

In an alternative form of a method aspect, the invention comprises:
a method of manufacture of a composite hollow vessel, the method comprising the steps of:
a) taking a fibrous layer of material and placing the material into a mould having a predetermined internal shape;
b) forming a the fibrous layer into a shape conforming with the mould;
c) introducing a thermoplastics material into the mould and heating the material
d) allowing the thermoplastics material to at least partially penetrate the fibrous layer
e) heating the first layer sufficient to morph from a solid to a flowable state;
f) allowing the first layer to flow at least part way through the thickness of the at least one fibrous layer to form a wall of an article to be formed in the mould;
g) allowing the first layer to cool so that at least some fibres of the at least one fibrous layer are embedded in the first layer;
h) removing the article from the mould.

According to one embodiment the method comprises the further step of prior to introduction of said fibrous layer into said mould, applying a primer to the fibrous layer The primer increases penetrability of the thermoplastics material into said fibres during rotation of said mould. The primer is preferably sprayed as a paste onto the fibrous layer and according to one embodiment comprises polystyrene dissolved in styrene. The primer may be pre mixed with a suspension of thermoplastics powder allowing the primer to fix fibres of the fibrous layer in place for engagement with flowable heat melted thermoplastics. The method includes the further step of applying at least one additional fibrous layer and thermosetting resin to the second layer. The fibrous layer may be initially formed into a predetermined required shape prior to heating the thermoplastics layer wherein, the thermoplastic layer is melted around the fibrous layer causing it to flow at least part way through the thickness of the fibrous layer.

According to a preferred embodiment the method comprises the further step of i) applying a thermosetting resin to fibres of the fibrous layer not embedded in the first layer to form a second layer such that the first layer is bonded with the second layer.

The method comprises the further preliminary step of applying a release agent to the mould prior introduction of the fibrous layer.

Preferably, when the article is released form the mould it has a smooth inner surface.

According to an alternative embodiment, the fibrous material which has sufficient strength to carry the structural loads applied to the finished article is moulded to a particular shape whereupon it is subject to a time temperature cycle allowing the thermoplastic to flow through the fibrous materials and form smooth interior and exterior surfaces on the article. If sufficient thermoplastic is supplied there will be an inner portion of the article which contains no fibres. In this way an article will be formed with a thermoplastic interior which will protect the structural fibres from any environmental attack by the contents of the article in service.

BRIEF DESCRIPTION OF DRAWINGS

The present invention will now be described in more detail according to preferred embodiments and with reference to the accompanying illustrations wherein.

DETAILED DESCRIPTION

In a broad general sense the present invention provides a method of coupling two dissimilar plastic materials which do not naturally form a bond by allowing one of the materials to flow partially through a fibrous layer and then to wet the remaining fibres with the second material. The materials are mechanically coupled together by the fibres which traverse the interface between the two materials. Many structural and non structural articles may be constructed from the so formed composite.

The present invention will be described primarily with reference to its application in portable tanker storage vessels and also its application to aircraft wing fuel tanks. It will however be appreciated that the invention has other applications. Features of the dual construction This invention particularly applies when the first material is a thermoplastic which flows at a temperature above its melting point into the fibrous layer and the second is a thermosetting resin which is applied to the unoccupied fibres after the thermoplastic has cooled.

The invention is founded on a technique providing a layered composite comprising a first thermoplastic layer in which is embedded a layer of fibrous material. The thermoplastic layer is melted to at least partially envelop the fibrous layer. The composite includes at least a second thermosetting resin layer which is disposed over the fibrous layer.

The methodology embodied in the invention employs rotational moulding normally employed for the manufacture of hollow plastic articles in a split mould. Typically a thermoplastic powder is loaded into the mould which is heated in an oven while it is rotated about two axes simultaneously. The powder melts and coats the inside of the mould uniformly. As the mould rotates the flowable thermoplastic material conforms to the internal shape of the mould. After cooling the moulded piece is removed from the split mould.

Figure 1:
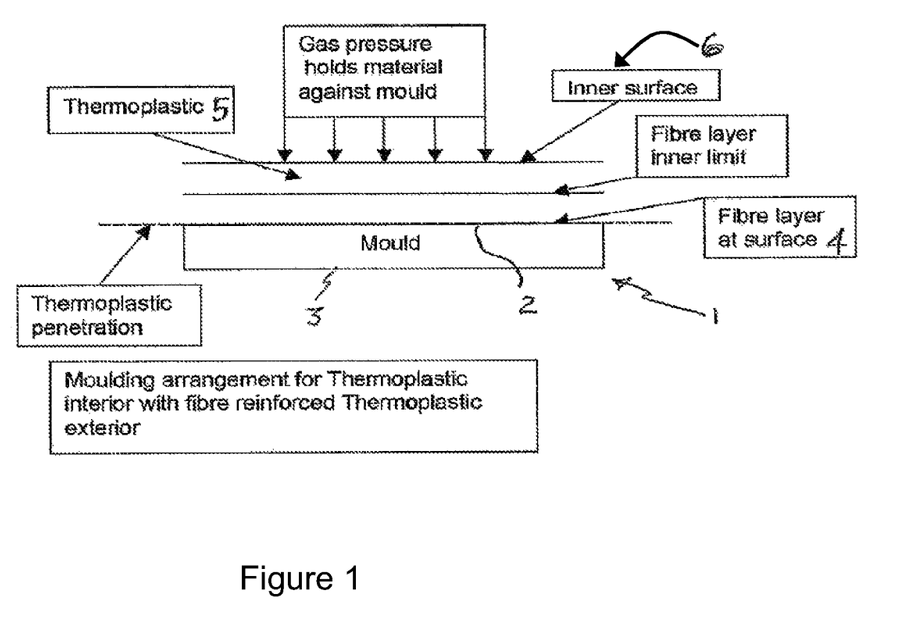
FIG. 1 shows a schematic view of the moulding regime for preparing the thermoplastic layer with a first degree of penetration of the fibrous layer within the thermoplastic layer providing smooth inner and outer layers.

Referring to FIG. 1 there is shown a schematic view of the moulding regime for preparing the thermoplastic layer with a first degree of penetration of the fibrous layer within the thermoplastic layer. Mould 1 has an inner surface 2 and outer surface 3. In use, a fibre layer 4 is laid on inner surface 2 following application of a release agent. When the inner surface of the mould is covered with a fibrous layer 4 a thermoplastic powder represented by layer 5 is introduced into the mould. Upon the application of a predetermined temperature-time relationship the thermoplastic 5 flows against fibre layer 4 and at least partially penetrates into the interstices of the fibre layer. The penetration of the fibre layer by the thermoplastic layer is usually partial but can be fully enveloped. Typically, when the moulded article is removed from the mould, inner surface 6 is a smooth melted thermoplastic surface and the exterior is the fibrous material layer 4 partly immersed in the thermoplastic. During moulding gas pressure is used to hold the composite against the mould wall.

Figure 2:
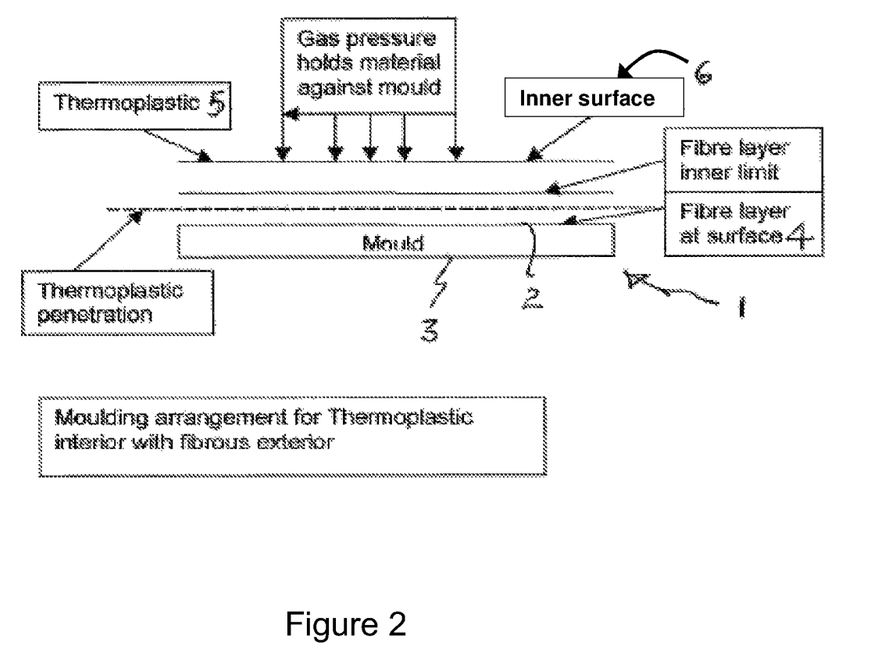
FIG. 2 shows a schematic view of the moulding regime for preparing the thermoplastic layer with a second degree of penetration of the fibrous layer within the thermoplastic layer.

FIG. 2 shows with corresponding numbering, a schematic view of the moulding regime for preparing the thermoplastic layer with a second degree of penetration of the fibrous layer within the thermoplastic layer. The main difference between the arrangement of FIG. 1 and that of FIG. 2 is the lesser extent of thermoplastic penetration into the fibre layer 4.

When the article is extracted form the mould, the exterior part of the fibrous layer is wetted with a liquid catalysed resin which hardens and is coupled to the interior thermoplastic by the fibres which bridge the interface between the two layers. Further layers of fibres and resin can be laminated onto the exterior to carry the structural loads imposed by the contents and the service. Glass and carbon fibres are the preferred materials to form the fibrous layer 4 and to reinforce both the thermoplastic and thermosetting layers. The preferred form of the fibrous layer is a woven cloth so that the alternate strands of the warp and the weft traverse the thickness of the cloth. Other forms of the fibrous layer may be mat or felt provided that there are a substantial portion of the fibres which traverse the thickness of the layer. The fibrous layer 4 is placed into the open parts of the mould which is then closed with the load of thermoplastic powder placed therein. The rotational moulding is completed by rotating the mould about two axes during a thermal cycle of heating and cooling. As an alternative method the fibrous layer can be made as a preform of fibres held in shape with a binder. The preform is then inserted into the mould. The fibrous layer can be formed in situ in the mould by wetting the fibres with a binder solution and allowing the solvent to evaporate before closing the mould. The binder may be polystyrene or polymethylmethacrylate dissolved in their respective monomers styrene and methyl methacrylate as the solvent. They are thermoplastic which melts and forms a copolymer with the thermoplastic powder and is also soluble in the styrene monomer of the thermoset resin thus ensuring complete compatibility throughout the dual construction. It will be appreciated that other combinations of binder and solvent may be used. The aforesaid step addresses the problem of high viscosity materials which do not penetrate sufficiently to ensure satisfactory bonding. Unsatisfactory boding can result in delamination of layers and hence failure of the article constructed using the methodology. On rotation of the mould, the binder penetrates the fibres of the fibrous layer and enhances bonding of the melting thermoplastics and fibres of the fibrous layer. The fibres are held in place once the binder evaporates and this greatly enhances bonding between layers.

The fibrous layer can be held in position against the interior of the mould by supplying a gas flow into the interior of the mould so that a pressure drop across the fibrous layer forces it against the mould. In the rotational moulding operation the powdered thermoplastic is introduced into the mould after the fibrous material is in place. As the mould rotates about two axes simultaneously the powdered thermoplastic is distributed uniformly and begins to melt as the mould is heated from the outside The conditions of temperature, time and thermoplastic powder volume can be adjusted so that the article can be produced from this moulding process with a smooth thermoplastic interior and exterior with the fibres adjacent to the exterior as is shown in FIG. 1 or with a smooth thermoplastic interior and a fibrous exterior ready for joining to a Thermoset layer as shown in FIG. 2. As the thermoplastic powder melts and flows into the fibrous material, a flow resistance to the gas supplied to the mould interior increases until all the pores are sealed and the gas pressure acts on the smooth molten interior thermoplastic surface This pressure is maintained during the cooling phase to prevent any movements due to differential thermal contractions. These operations are schematically shown in both FIGS. 1 and 2.

Suitable thermoplastics are but not limited to: polyethylene (HDPE), polypropylene (PP), polyvinylidene fluoride (PVDF), ethylene chloro tri fluoro ethylene (EC TEE). Suitable thermosetting resins are, but not limited to polyester, vinylester, epoxy and polyurethane.

Preferred applications of the aforesaid structure produced from the mould constructions are where the particular properties of each are advantageously employed. The thermoplastics have excellent chemical resistance to a wide range of pH, oxidative and solvent conditions and large elongation without damage. The thermosetting resins, when reinforced by structural fibres have high strength and stiffness. Both have low density, so the combination is best suited to the situations benefiting from light weight structures in aggressive chemical environments.

Practical Applications of Moulded Composite

Examples of the applications of the method and apparatus aspects of the invention includes storage tanks for vehicles and containers for the transport of hazardous materials are the construction of fuel and cargo tanks for the transport vehicles. Other non limiting examples of practical applications include: fuel tanks for marine, road, rail, air and space vehicles and craft; cargo tanks for the carriage of hazardous chemicals, fuels, milk and beverages (wine beer and fruit juices) by the various transportation modes; cargo tanks for all these applications where the tanks are mounted on wheeled systems and cargo tanks which are mounted in standardised ISO intermodal container frames.

Implementation

1 Iso-tensoid hydrostatic tanks
2 Iso-tensoid hydrostatic plus pressure tanks
3 Transport tanks subject to bending 1 Iso-Tensoid Tanks A liquid or gas contained by a flexible tensile tanks forming membrane will assume a shape in which the membrane is stressed in uniform tension without any bending stress. Examples in nature of these shapes are liquids contained by surface tension such as a water drop hanging from a leaf tip, water pooling on a leaf and mercury on a flat surface. A flexible canvas water bag forms itself into a rectangular tank with uniform tension in its wall. This iso-tensoid shape carries the loads due to the contents without bending stresses in the walls which results minimum composite wall thickness required to carry loads.

Figure 3:
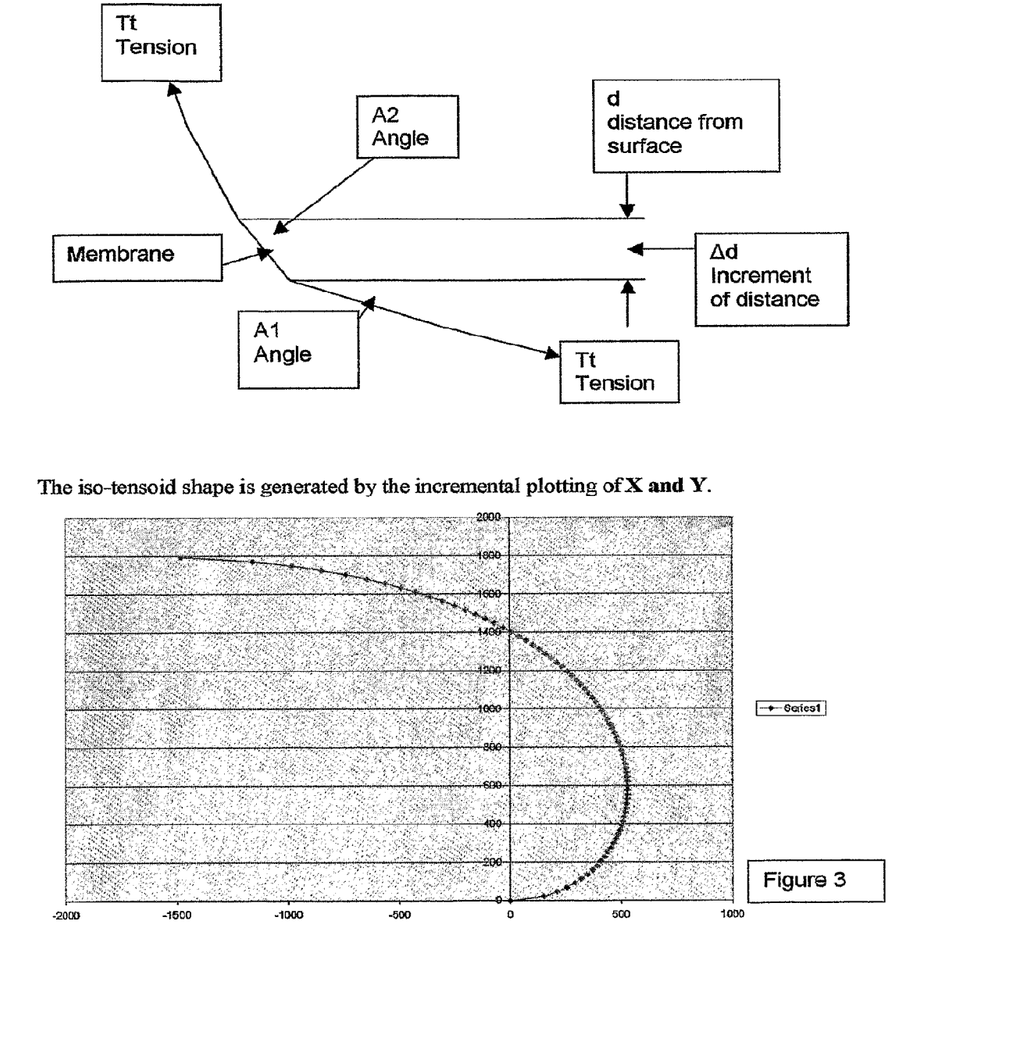
FIG. 3 is an example of an iso-tensoid curve which can be joined to its mirror image by to form a closed membrane with uniform tension.

FIG. 3 is an example of an iso-tensoid curve which can be joined to its mirror image by to form a closed membrane with uniform tension.

The iso-tensoid shape as a horizontal rectangular tank for hydrostatic loading is defined by the following calculations:

Membrane tension due to hydrostatic pressure "Th"

$$Th = (\rho * g * D^2)/4$$

$\rho$ Density of liquid
  g Acceleration due to gravity
  D Total depth of liquid in the membrane
  Membrane tension due to constant, superimposed pressure "Tc"

$$Tc = P * D/2$$

P Superimposed pressure.
  The total tension is the sum of the se two:

$$Tt = Th + Tc = (\rho * g * D^2)/4 + P*D/2$$

Equating horizontal forces acting on the membrane over an increment of depth $\delta d$ ay a variable depth d with both hydrostatic and constant superimposed pressure:

$$(Th+Tc)*((\cos(A2)-\cos(A1))=P*\delta d+\rho*g*d*\delta d \text{ then}$$

$$\cos A2 = \cos A1 + (P*\delta d + \rho*g*d*\delta d)/(P*D/2 + (\rho*g*D^2)/4)$$

Note Thus calculation starts with A1=0 at the bottom and "d" measured from the top of the membrane and adds $\delta d$ for each increment, $\delta d$ is negative.

$$\delta x = \delta d/\tan(A2)$$

$$X = \sum_{0}^{d}(dx)$$

δx is the horizontal increment of the membrane coordinate $$Y = \sum_{0}^{d}(dy)$$

δy is the vertical increment of the membrane coordinate

By joining the upper and lower terminations of the curve to the corresponding points of a mirror image curve with horizontal lines, a closed curve is formed which is the cross section of an iso tensoid tank.

2 Iso-Tensoid Hydrostatic Plus Superimposed Pressure Tanks.

The applications of this combined shape are closed tanks with a hydrostatic loading and an additional applied pressure. Non limiting examples are:
i) Horizontal stationary tanks
ii) Horizontal fuel tanks mounted in transport vehicles, road, rail, air and marine.
iii) Horizontal cargo tanks mounted in or on transport vehicles, road, rail, air and marine.
iv) Horizontal cargo tanks arranged as a road tanker trailer with a turntable mounted at the front end and wheels, axles and suspensions at the rear end.

3 Transport/Cargo Tanks Subject to Bending

The broad method steps for constructions of such tanks is outlined below:
1 An outer shell is constructed in two moulds which join along a centreline. The mould is shaped according to the product to be manufactured from the mould.
2 The moulds includes vertical recesses to form the upper coamings and the lower rails.
3 The mould is prepared with a release agent followed by a gel coat of pigmented resin.
4 This is followed by layers of structural fibres which will carry the shearing forces generated by the transport operations.
5 Continuous structural fibres saturated with resin are placed into these recesses to form a structural rectangular frame which carries all the loads generated by the operations on the road.
6 A further two moulds shaped to form the end caps of the tanker make the structural connection between the two longitudinal mouldings.
7 The dual construction compartments, with thermoplastic interior and the fibre reinforced plastic outer zone thickened to carry the tension loads are assembled into the space between the two laminated moulds the length of the complete tanker.
8 The inner compartments are placed between the outer mouldings with spacers to maintain a uniform gap.
9 This gap is then filled with structural foam injected into the space.

Figure 4:
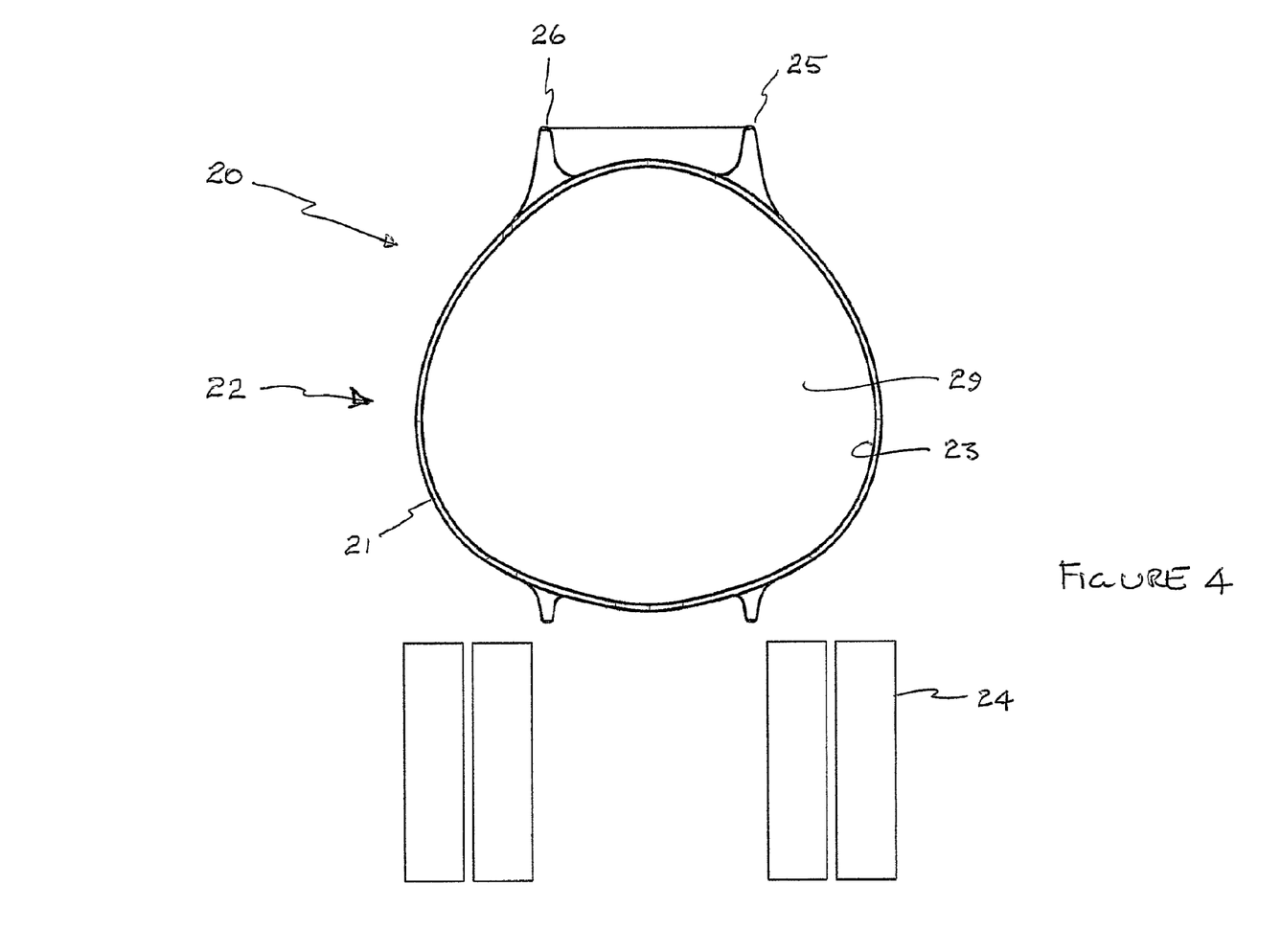
FIG. 4 shows a cross sectional view of a tank made in accordance with the methodology of the invention.

Referring to FIG. 4 there is shown a cross sectional view of a tank 20 made in accordance with the methodology of the invention schematically mounted on wheel base 24. Tank 20 comprises a composite wall 21 having an outer skin 22, an inner surface 23 defining an isotensoid shaped void 29. Wall 21 further preferably comprises integrated carbon fibre coamings 25 and 26, 27 and 28 disposed as four bars which carry applied tension and compression loads. The coamings are formed by introducing appropriate cavities in the mould from which the tank is produced. The coamings are set a maximum distance apart so that the areas required for the bars to carry the loads are minimised and since the Moment of Inertia is very large, this results in a strong stiff structure and minimum wall and overall body deflections. This high efficiency structure (one in which the maximum of the materials in the structure are stressed to near their allowable limit) results in the minimum use of materials which also results in the minimum mass and cost. The lower coamings 27 and 28 are integrally formed to provide mountings for the running gear, landing legs, spare wheels and king pin plate. The Tank 20 of FIG. 4 may be employed in the transport of hazardous materials and as fuel and cargo tanks for transport vehicles.

As indicated specific non limiting applications are in fuel tanks for marine, road, rail, air and space vehicles and craft; cargo tanks for the carriage of hazardous chemicals, fuels, milk and beverages (wine beer and fruit juices) by the various transportation modes; cargo tanks for all these applications where the tanks are mounted on wheeled systems; cargo tanks which are mounted in standardised ISO intermodal container frames.

The iso-tensoid shape applied to tank 20 carries contents loads resisting applied bending stresses in the walls which is designed with a minimum thickness required to carry the applied loads. The iso-tensoid shape as a horizontal rectangular tank for hydrostatic loading and superimposed uniform pressure is defined by mathematical calculations mentioned earlier.

Figure 5:
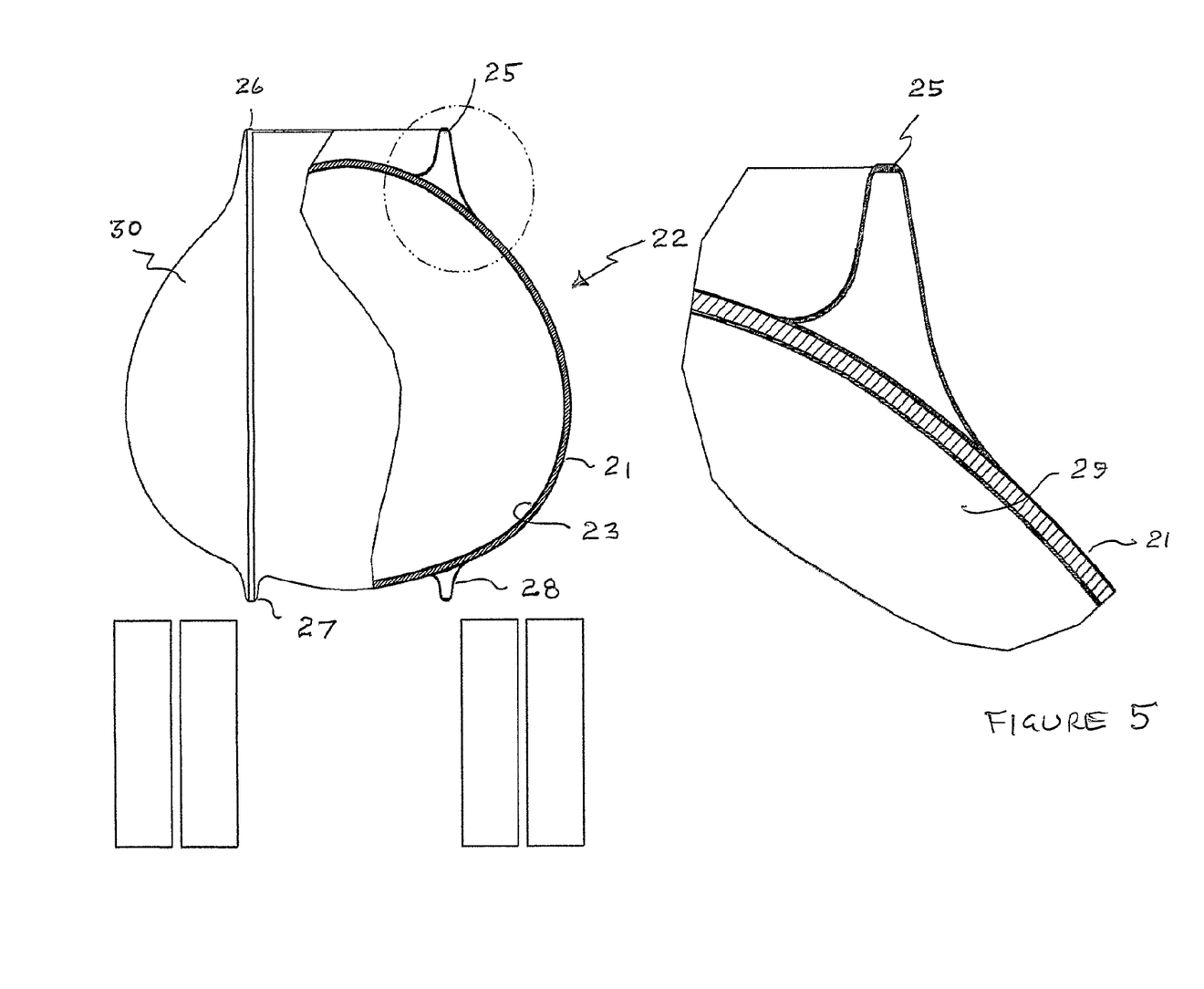
FIG. 5 shows an end view of a tank made in accordance with the methodology of the invention with partial abbreviation to reveal wall structure.
Figure 6:
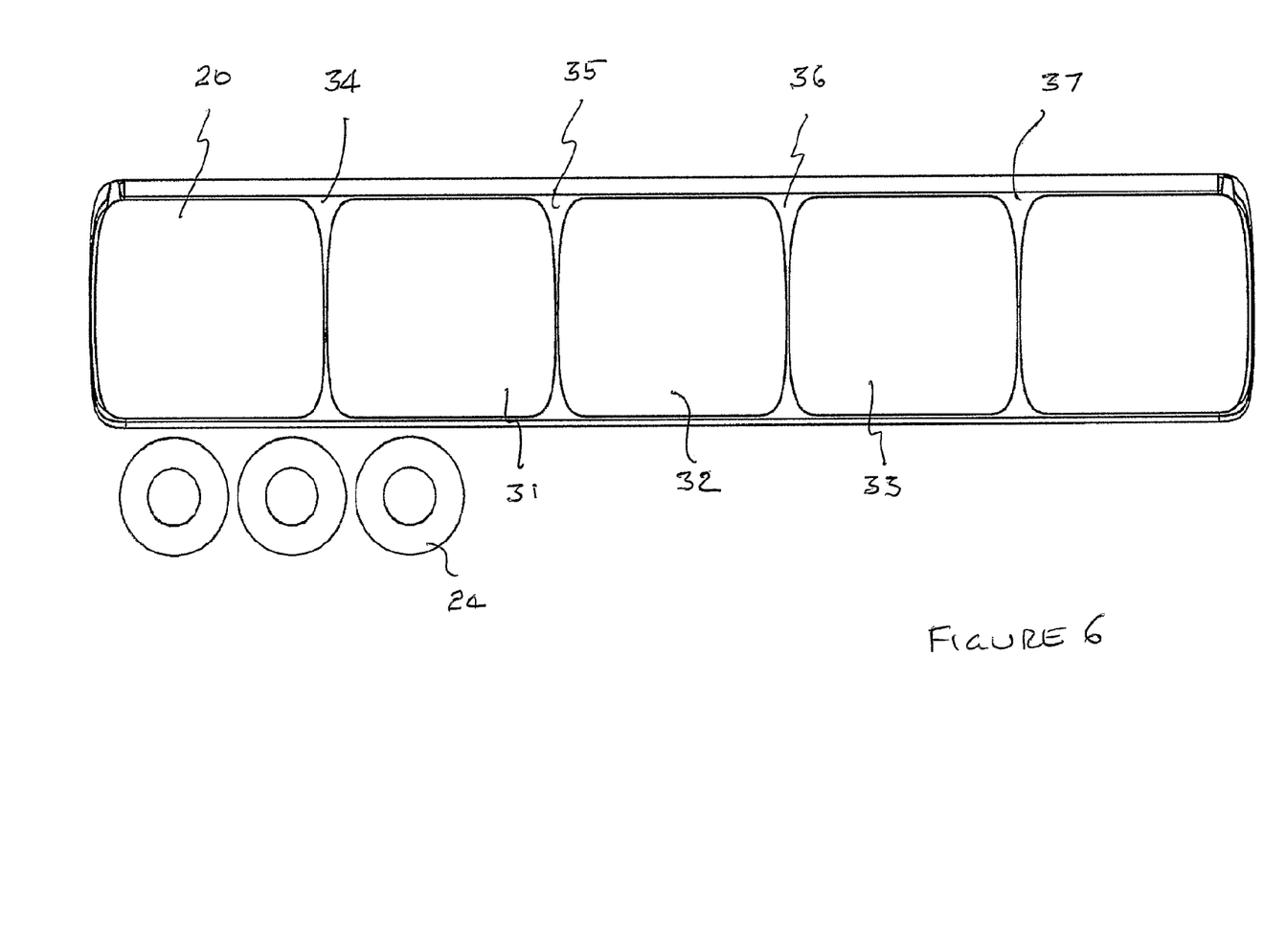
FIG. 6 shows a side elevation of a trailer manufactured in accordance with the method of the invention with inner compartments exposed to view.

FIG. 5 shows with corresponding numbering an end view of a tank 20 made in accordance with the methodology of the invention with partial abbreviation to reveal wall structure 22 and end formation 30. FIG. 6 shows a side elevation of a trailer manufactured in accordance with the method of the invention tank 20 at rear and with additional longitudinally disposed inner compartments 31, 32 and 33 exposed to view.

Compartments 31, 32 and 33 have thermoplastic compartment interiors and are suitable for transport of such products as fuels, food and chemicals. The moulded structural shell with smooth exterior gel coat surface is easy to clean with an attractive appearance.

Structural foam insulation is placed in spaces 34, 35, 36 and 37 adjacent compartments 31, 32 and 33 to provide protection for the compartments against penetrating damage, punching shear and other unwanted impact loadings. Foam insulation enables carriage of perishable foods.

Figure 7:
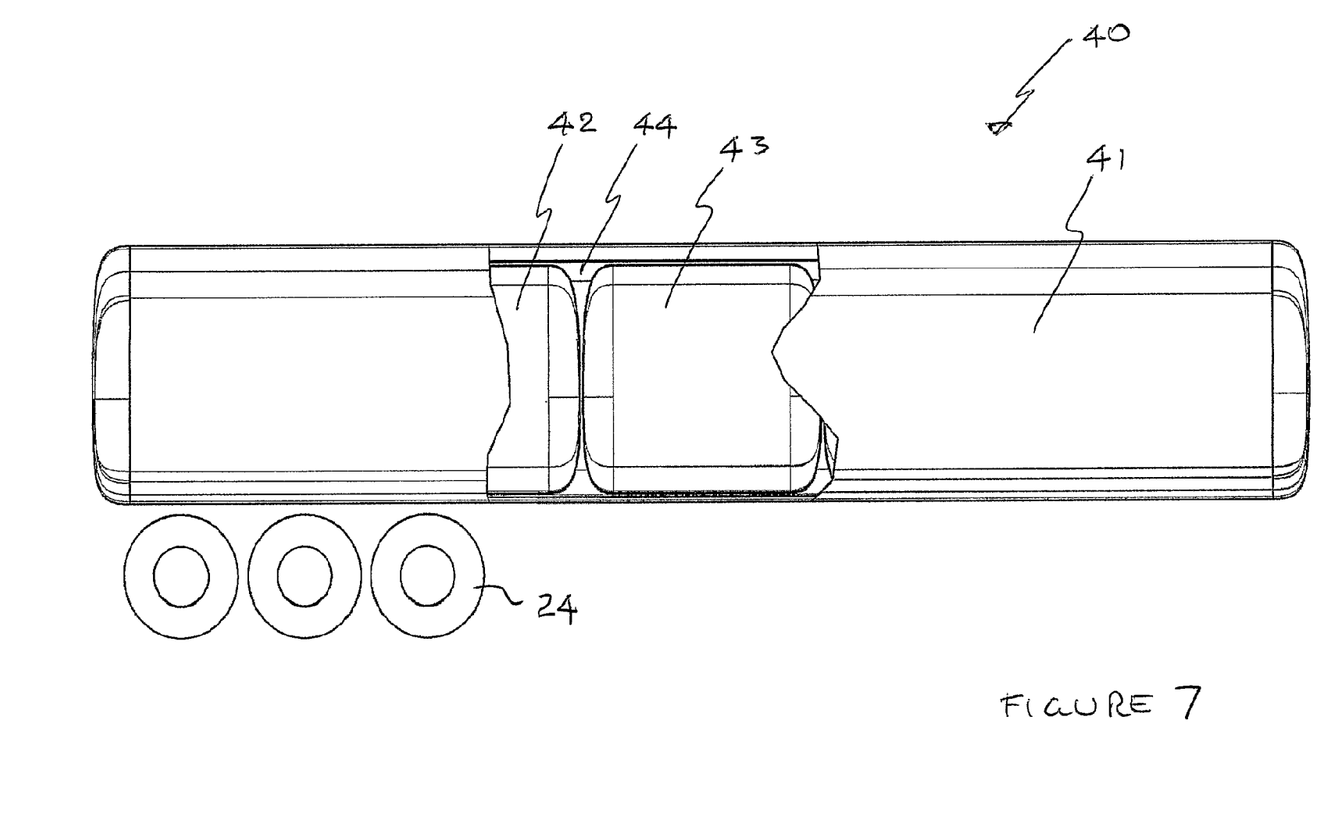
FIG. 7 shows a side elevation of a trailer manufactured in accordance with the method of the invention with outer structural skin and partial view of inner compartments exposed to view.

FIG. 7 shows a side elevation of a trailer 40 manufactured in accordance with the method of the invention with outer structural skin 41 and partial view of inner compartments 42 and 43 exposed to view. Adjacent compartments 42 and 43 is a foam filled structural interspace 44.

Continuous structural fibres in an outer shell layer provide roll-over protection. The thermoplastic elongation at break of greater than 50% gives protection against rupture in the case of accident. The shape of the inner compartments generated by the condition for uniform tension has a lower centre of gravity than a comparable circle or ellipse and the structural shell design allows the tank shell to be set as low as possible towards the suspension. This lowered centre of gravity improves vehicle stability and reduces the risk of a roll-over accident. A result of the iso tensoid compartment shape and the design efficiency in using the structural fibres is that the mass of the road tanker is substantially less than those of comparable existing metal and composite road tankers.

The procedure for rotational moulding a tank incorporating a thermoplastic sheet with fibre backing suitable for use in a road tanker employs a two piece mould which can be separated after moulding is complete. The part is produced by rotational moulding of a thermoplastic powder into a hollow mould with a fibrous layer in contact with the interior surface of the mould. The mould is a cylindrical, non circular cross section with domed ends. The cylindrical part may be formed by rolling. The non circular, the domed half-ends and are preferably made on a former generated by "CAD CAM" procedures to produce a male profile shape. On this former a CAD developed shape of woven wire of suitable gauge and aperture is stabilised with flanges and reinforcing ribs. The flanged ends are preferably bolted onto the cylindrical section to form one half of the mould. This half mould is composed of woven wire mesh reinforcing and stabilized with flanges and ribs. This mould half is placed in a plenum chamber with an extraction fan which will draw air through the wire mesh. A fibrous layer, preferably in the form of a woven cloth is then draped into the mould half and held in place by the pressure drop caused by the fan air flow. When the fibrous layer is in place a thermoplastic binder carried in a solvent is then applied to the layer which will hold the fibres in place when the solvent has evaporated. The second half mould is treated in the same way and the two half moulds are then bolted together ready for the rotational moulding process. In the rotational moulding process an air supply is arranged to pass through the fibrous layer and the mesh mould to keep the fibrous layer in close contact with the mould. As the temperature in the mould rises the powder and the binder melt and flow into the layer and partially penetrate this fibrous layer and form a smooth fused surface on the interior of the moulding. The mould and its contents are allowed to cool and the mould is split and the part removed.

Figure 10:
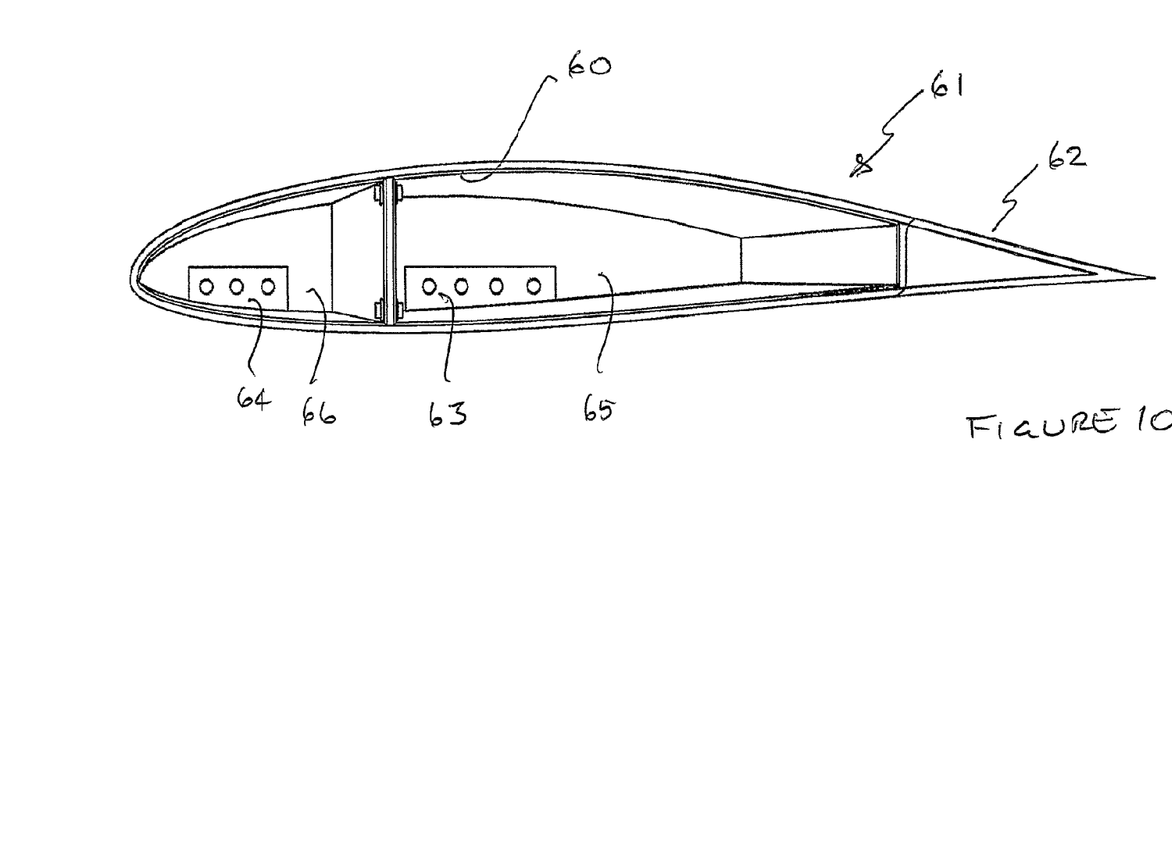
FIG. 10 shows a cross sectional elevation of an aerofoil vessel.

The composite of the present invention may be applied to aircraft for example as wing fuel tanks. Plastics layered composites may be used as iso tensoid tanks as multi compartment structural members for aircraft wings complete with integral fuel tanks. This shape can be approximated by the iso tensoid shape. Deviations from this shape approximation at the leading and trailing edges of wing structure 61 can be arranged to accommodate leading and trailing edge high lift devices in region 62 such as flaps (as shown in FIG. 10).

Figure 8:
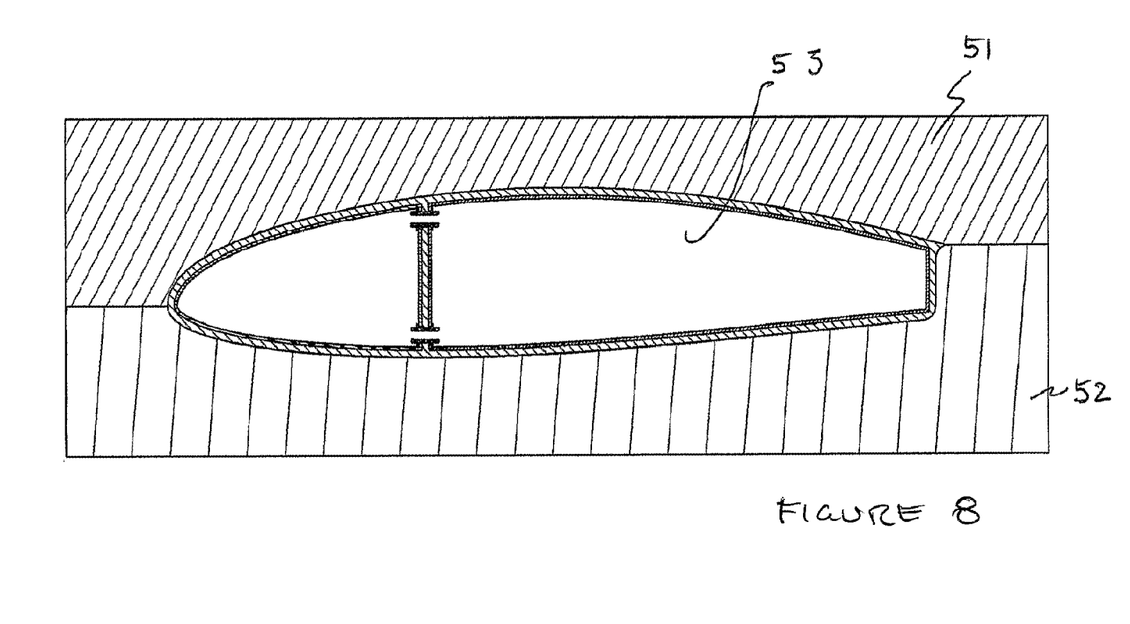
FIG. 8 shows a cross sectional elevation of a mould assembly and aerofoil shaped vessel manufactured from the mould.
Figure 9:
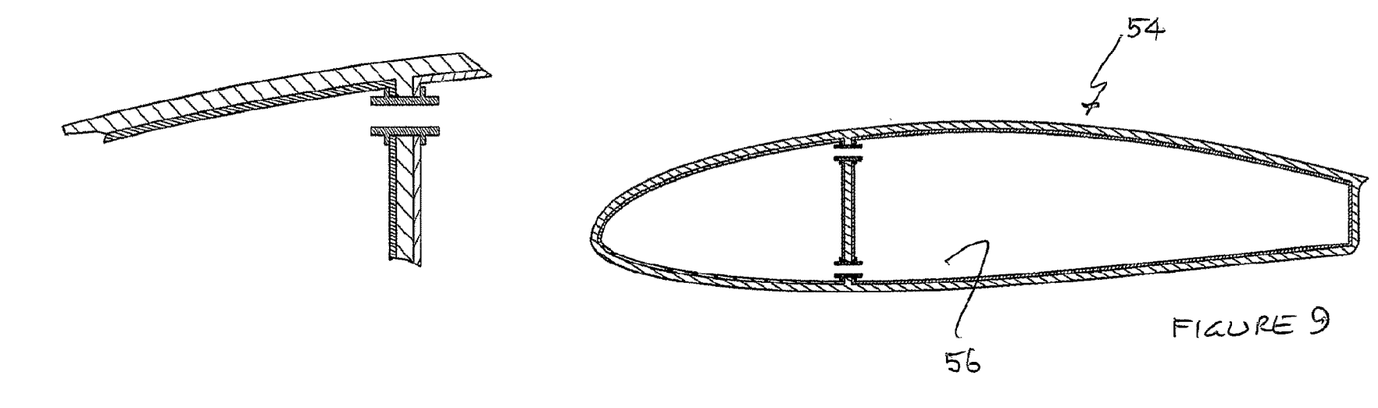
FIG. 9 shows the aerofoil shaped vessel extracted from the mould.

A typical aircraft wing section is an aerofoil comprising a curved upper surface and a lower surface with substantially lower curvature. FIG. 8 shows a cross sectional elevation of a mould assembly 50 and aerofoil shaped vessel manufactured from the mould. Mould 50 comprises two parts 51 and 52 defining an aerofoil shaped opening 53. FIG. 9 shows the aerofoil shaped vessel 54 extracted from the mould 50. Vessel 54 comprises an integral outer structural skin 55 and inner cell 56. FIG. 10 shows a cross sectional elevation of an aerofoil vessel 60 incorporated in a wing structure 61. Vessel 60 may be reinforced with metal baffle inserts at locations of stress application particularly when the tank an wing are integrally attached.

Figure 11:
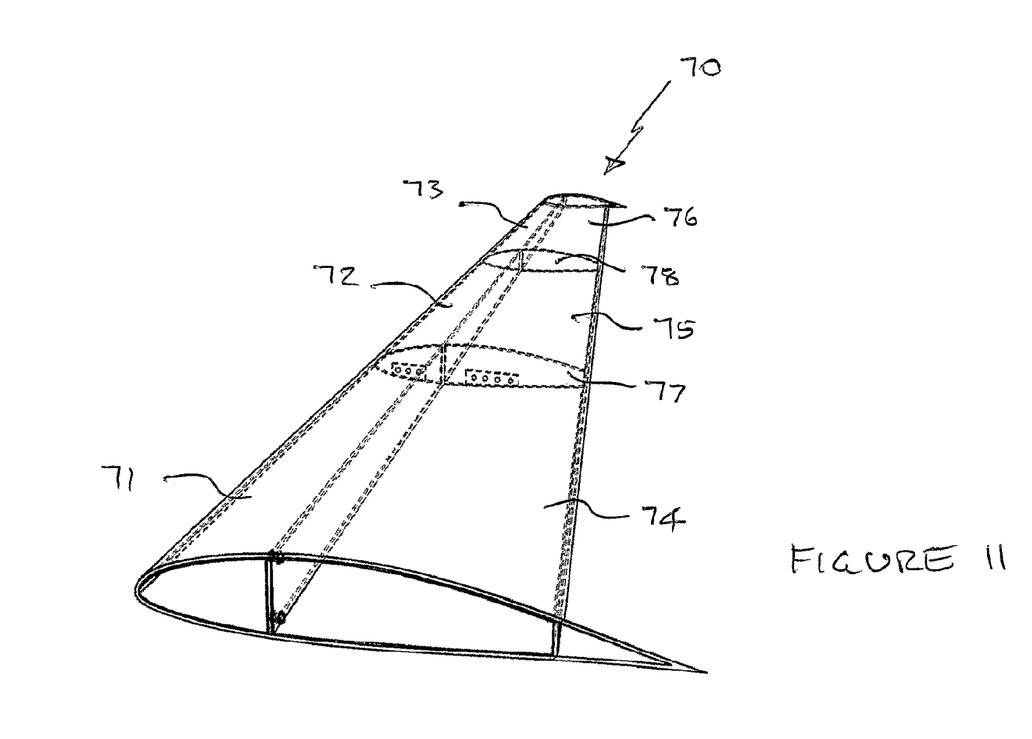
FIG. 11 shows a perspective view of an aircraft wing incorporating vessels made in accordance with the method of the invention.

FIG. 11 shows a perspective view of an aircraft wing 70 incorporating vessels made in accordance with the method of the invention. Wing 70 is constructed from leading edge vessels 71, 72 and 73 and trailing edge compartments 74, 75 and 76. Wing 70 further comprises webs 77 and 78. For this shape to be used as the structural member of a wing subject to bending and torsion the two surfaces must be connected to carry the shear and peeling stresses generated by the loading. These webs run longitudinally with transverse webs at intervals along the wing. In this way the structural member can be built up by an assembly of individual dual construction compartments of iso tensoid cross section and straight walls to match the wing profile as shown in FIG. 11.

These dual construction compartments function as both structural members and fuel tanks with a thermoplastic interior which is completely resistant to the chemicals in the fuel systems. This interior is moulded in as a complete surface with no joints or welds. No maintenance is required. The exterior layer of the compartment is composed of sufficient fibre reinforced plastic to carry the fuel loads in tension.

For the compartments to function as fuel tanks each one is preferably fitted with integrally formed connections to allow the functions of filling and supply to the engines and venting to control the pressure in the tanks. These connections may be used in the assembly of these compartments into position for the construction of the structural member. The loading due to the fuel in the compartments is carried by tension in the curved isotensoid surfaces and is balanced across the vertical web walls as the fuel level is equalised by flow through the connections between the compartments. The short vertical web walls are designed to carry any imbalanced fuel load. The compartments may be assembled to become the core of the wing structural member by drawing the compartments into position with hollow fasteners sealing into the connections which thus forms the fuel supply and venting systems.

An external mould as shown in FIG. 11 is provided to form the external shape and surface of the wing. Using the known techniques for reinforced plastic construction resin and the structural fibres are placed in the mould which is then closed around the assembly of compartments. The space inside the interconnected compartments is then inflated to press the compartment walls against the resin and fibres in the mould. This inflation pressure is held until the resin cures by catalyzation or heat or combination of both. Metallic inserts may be placed between the compartment walls as attachment points for concentrated loads.

It will be recognised by persons skilled in the art that numerous variations and modifications may be made to the invention as broadly described herein without departing from the overall spirit and scope of the invention.

What is claimed is:

1. A method of manufacturing a composite hollow vessel in a hollow rotational mould, the method comprising:
   a) placing a layer of fibrous material against an inner surface of the hollow rotational mould, said mould having a predetermined internal shape;
   b) then placing the layer of fibrous material so that it conforms to a shape of an inner surface of the hollow rotational mould;
   c) then introducing a thermoplastic material into the hollow rotational mould and heating the material and rotating the mould;
      wherein the thermoplastic material is allowed to at least partially penetrate the layer of fibrous material;
      wherein the thermoplastic material is sufficiently heated to enable that material to morph from a solid to a flowable state; and
      wherein the thermoplastic material is allowed to flow at least part way through the thickness of the layer of fibrous material to form a wall of the composite vessel to be formed in the hollow rotational mould;
   d) allowing the thermoplastic material to cool so that at least some fibres of the layer of fibrous material are embedded in the thermoplastic material;

e) removing the composite hollow vessel from the hollow rotational mould;

wherein the mould is close ended and is simultaneously rotated about two axes; and f) then applying a thermosetting resin to fibres of the layer of fibrous material not embedded in the thermoplastic material to thereby form a bond between the thermoplastic material and the thermosetting resin.

2. A method according to claim 1, wherein the fibrous material is in the form of:
(i) a woven cloth; or
(ii) a mat or felt; or
(iii) a preform of fibres.

3. A method according to claim 1, wherein the thermoplastic material is selected from the group consisting of polyethylene, polypropylene (PP), polyvinylidene fluoride (PVDF), and ethylenechlorotrifluoroethylene (ECTFE).

4. A method according to claim 1, wherein the thermosetting resin is selected from the group consisting of polyester, vinylester, epoxy, and polyurethane.

5. A method according to claim 1, wherein the composite hollow vessel is a storage tank.

6. A method according to claim 1, wherein the composite hollow vessel is a transportation tank.

7. A method according to claim 1, wherein in paragraph (c), the thermoplastic material is placed inside the hollow rotational mould, and then the thermoplastic material is heated inside the hollow rotational mould into a molten state while the thermoplastic material and the hollow rotational mould are rotated.

8. A method according to claim 1, wherein the thermoplastic layer material is introduced into the mould in powder form prior to heating.

* * * * *